United States Patent Office 2,925,404
Patented Feb. 16, 1960

---

2,925,404

CO-POLYESTERS OF A DICARBOXYLIC ACID, A DIHYDRIC ALCOHOL, AND A SUBSTITUTED BENZENESULFONAMIDE

John R. Caldwell and John W. Wellman, Kingsport, Tenn., assignors to Eastman Kodak Company, Rochester, N.Y., a corporation of New Jersey No Drawing. Application March 30, 1954
Serial No. 419,912

5 Claims. (Cl. 260—49)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U. S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at superatmospheric pressures with cellulose acetate dyes in order to obtain practical shades. This process requires the use of expense equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new linear polyesters from which fibers can be prepared which have improved dye affinity, especially for cellulose acetate type dyes.

Another object of the invention is to provide new and improved linear polyesters containing a sulfonamide group in the main molecular chain.

Another object of the invention is to provide new and improved polyesters suitable for the manufacture of fibers which can be dyed to practical shades under ordinary conditions with or without the use of superatmospheric pressures or dyeing assistants.

Another object of the invention is to provide a method for incorporating a N,N-di($\beta$-hydroxyethyl) benzene sulfonamide or a derivative thereof into high molecular weight, fiber-forming polyesters.

Another object of the invention is to improve the dyeing properties of polyester fibers without substantially altering the melting point, tensile strength, elongation, or elastic recovery of the fibers.

Other objects will be apparent from the description and claims which follow.

These and other objects of the invention are accomplished by coreacting a polybasic organic acid, or an ester thereof, a polyhydric alcohol, and a sulfonamide of the formula

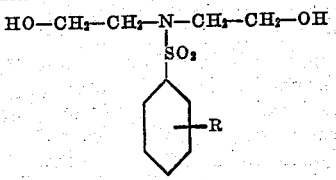

wherein R is selected from the group consisting of hydrogen and —N(CH$_3$)$_2$, —N(C$_2$H$_5$)$_2$, —SO$_2$N(CH$_3$)$_2$, —SO$_2$N(C$_2$H$_5$)$_2$, —CON(CH$_3$)$_2$, —CON(C$_2$H$_5$)$_2$, —OH, —Cl, —CH$_3$ and C$_2$H$_5$ radicals.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the sulfonamide groups in the main molecular chain.

The terpolymers of this invention are conveniently prepared by heating a mixture of the polybasic acid, polyhydric alcohol, and benzene sulfonamide as herein defined at atmospheric pressure, and preferably in the presence of a suitable condensation catalyst such as an amphoteric metal compound. The condensation reaction is desirably effected under an atmosphere of nitrogen and at a temperature of from about 150 to 300° C., and preferably from about 200 to 300° C. The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and C is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

In practicing this invention, any of the N,N-di($\beta$-hydroxyethyl) benzenesulfonamides as defined herein can be used to prepare the modified polyesters embodying this invention. Thus unsubstituted N,N-di($\beta$-hydroxyethyl) benzenesulfonamide itself can be used, or a derivative of this compound can be used having a substituent group in the ortho, meta or para position with respect to the sulfonamide group, the meta and para derivatives are preferred. The nuclear substituent group can be varied rather widely and can include a lower alkyl group such as a methyl or ethyl group; hydroxyl group; a chloro group; a dialkyl amino group such as a dimethyl or diethyl amino group; a dialkyl sulfonamide group such as dimethylsulfonamide or diethylsulfonamide group; a dialkyl carboxamido group such as the dimethylcarboxamido or diethylcarboxamido groups. Such a benzenesulfonamide is employed in an amount of from about 5 to about 25%, and preferably from about 10 to about 16 mole percent in the polyester. Since the benzenesulfonamides used in practicing this invention are dihydroxy compounds they function and take the place of part of the polyhydric alcohol ordinarily used in preparing polyester polymers. Thus in the process embodying this invention, the benzenesulfonamide enters directly into the polymer chain and hence modifies the polymer in its molecular structure unlike the modification which is obtained by attempting to modify a preformed polymer ester. The benzenesulfonamides employed in practicing the invention are typified by, but not limited to, such materials as N,N-di($\beta$-hydroxyethyl) benzenesulfonamide itself; nuclearly alkylated derivatives such as N,N-di($\beta$-hydroxyethyl)-p-toluene sulfonamide of the formula HO—CH$_2$—CH$_2$—N—CH$_2$—CH$_2$—OH
|
SO$_2$
|
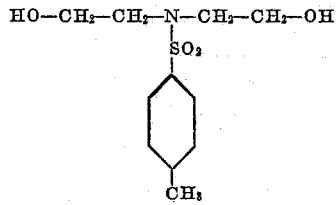
|
CH$_3$ alkyl amino derivatives such as N,N-di($\beta$-hydroxyethyl)-p-dimethylamino-benzenesulfonamide of the formula HO—CH$_2$—CH$_2$—N—CH$_2$—CH$_2$—OH
|
SO$_2$
|
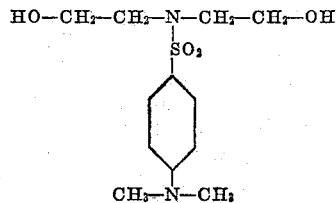
|
CH$_3$—N—CH$_3$ and N,N - di($\beta$ - hydroxyethyl) - p - diethylamino - benzenesulfonamide of the formula

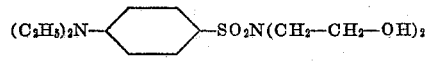
(C$_2$H$_5$)$_2$N—⟨ ⟩—SO$_2$N(CH$_2$—CH$_2$—OH)$_2$ dialkyl carboxamido derivatives such as N,N-di($\beta$-hydroxyethyl)-m-dimethylcarboxamido benzenesulfonamide of the formula

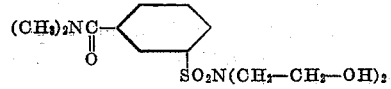
(CH$_3$)$_2$NC—
         ‖
         O
SO$_2$N(CH$_2$—CH$_2$—OH)$_2$ nuclearly hydroxylated benzenesulfonamides such as N,N - di($\beta$ - hydroxyethyl) - p - hydroxy - benzenesulfonamide of the formula

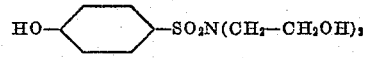
HO—⟨ ⟩—SO$_2$N(CH$_2$—CH$_2$OH)$_2$ and dialkyl sulfonamido derivatives such as N,N-di($\beta$-hydroxyethyl) - m - dimethylsulfamido - benzenesulfonamide of the formula

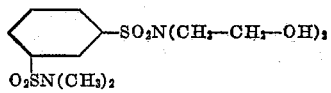
⟨ ⟩—SO$_2$N(CH$_2$—CH$_2$—OH)$_2$
|
O$_2$SN(CH$_3$)$_2$

Other benzenesulfonamides include the corresponding ortho, meta or para isomers of these or similar compounds.

In practicing the invention, the benzenesulfonamide is coreacted with a polybasic organic acid, or an ester thereof, and with a polyhydric alcohol which can be in the form of the free alcohol or esterified as described hereinafter. The reaction is desirably effected in the presence of an organo-metallic catalyst, a large number of which are described in the copending applications of John R. Caldwell, Serial Nos. 313,061 through 313,071, inclusive, filed October 3, 1952, now U.S. Patents 2,744,089–2,744,098, inclusive, and 2,744,129. The catalysts which are preferred for use in practicing this invention are the titanium compounds specifically disclosed in application Serial No. 313,072, now U.S. Patent 2,720,502; tin compounds as disclosed in application Serial No. 313,078, now U.S. Patent 2,720,507; and aluminum compounds as disclosed in application Serial No. 313,077, now U.S. Patent 2,720,506. When such catalysts are employed in preparing the polyester, the esterified polybasic acids and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalyst or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula

R$_1$OOC—R$_2$—COOR$_3$ wherein R$_1$ and R$_3$ are either hydrogen or alkyl radicals containing from 1 to 10 carbon atoms, and R$_2$ is an aliphatic hydrocarbon radical. Thus typical aliphatic dibasic dicarboxylic acids which can be employed include oxalic acid, succinic acid, adipic acid, sebacic acid, $\alpha,\alpha$-dimethyl glutaric acid, dimethyl malonic acid, diglycollic acid, $\beta$-oxydipropionic acid, $\gamma$-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula

R$_1$OOC—R$_2$—X—R$_3$—COOR$_4$ wherein R$_1$ and R$_4$ each represents hydrogen or an alkyl radical containing from 1 to 10 carbon atoms and R$_2$ and R$_3$ each represents (CH$_2$)$_{n-1}$, wherein $n$ is an integer of from 1 to 5 inclusive, and X represents a divalent aromatic radical of the formula

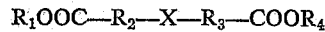

or

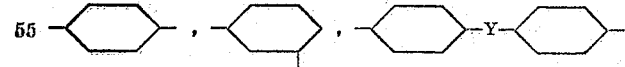

Y representing a radical of the formula —(CH$_2$)$_{n-1}$—;

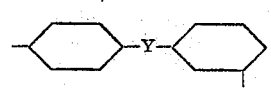
—(CH$_2$)$_{n-1}$—C—(CH$_2$)$_{n-1}$—; —(CH$_2$)$_{n-1}$—O—(CH$_2$)$_{n-1}$—
              ‖
              O

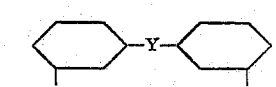
—O—(CH$_2$)$_n$—O—; —O—; —O—⟨ ⟩—O—

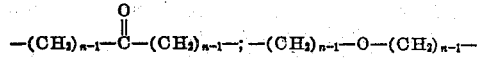
—(CH$_2$)$_{n-1}$—S—(CH$_2$)$_{n-1}$—; —S—(CH$_2$)$_n$—S—

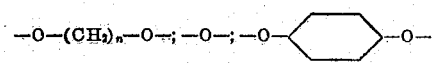
—S—⟨ ⟩—S—; —SO$_2$—; or (CH$_2$)$_{n-1}$—CH$_3$
                                      |
                                     —N—

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl-hexanediol can also be used. Other glycols which are suitable include the ether glycols such as diethylene glycol. Other polyhydroxy compounds containing 3 or more hydroxy radicals are also suitable as typified by glycerol, sorbitol, pentaerythritol, dipentaerythritol, β-methyl glycerol, 2-methyl - 2 - (hydroxymethyl) - 1,3 - propanediol, 1,2,4-trihydroxybutane, and similar polyhydroxy compounds. Thus it is apparent that the dihydroxy or polyhydroxy compounds used in practicing this invention need not be the free hydroxy compounds when a catalyst of the organo-metallic type is employed to promote the polyester formation. The polyhydric alcohol or ester thereof is desirably employed in an amount such that the combined amount of such polyhydric alcohol and the benzenesulfonamide gives an excess of hydroxy or substituted hydroxy radicals over the amount of carboxyl groups in the polybasic acid or esters employed in the reaction. Generally speaking, the hydroxyl groups are desirably present in an amount of from about 1.3 to about 3 times the amount of carboxyl groups, although excess amounts of as much as 10 times or more can be employed in some cases.

It is thus apparent that the benzenesulfonamides described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

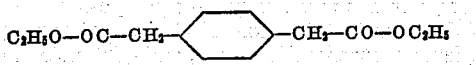

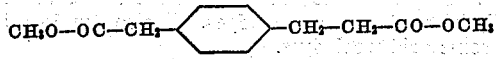

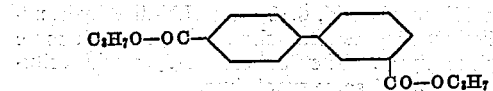

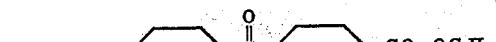

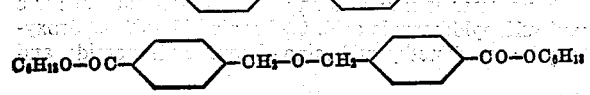

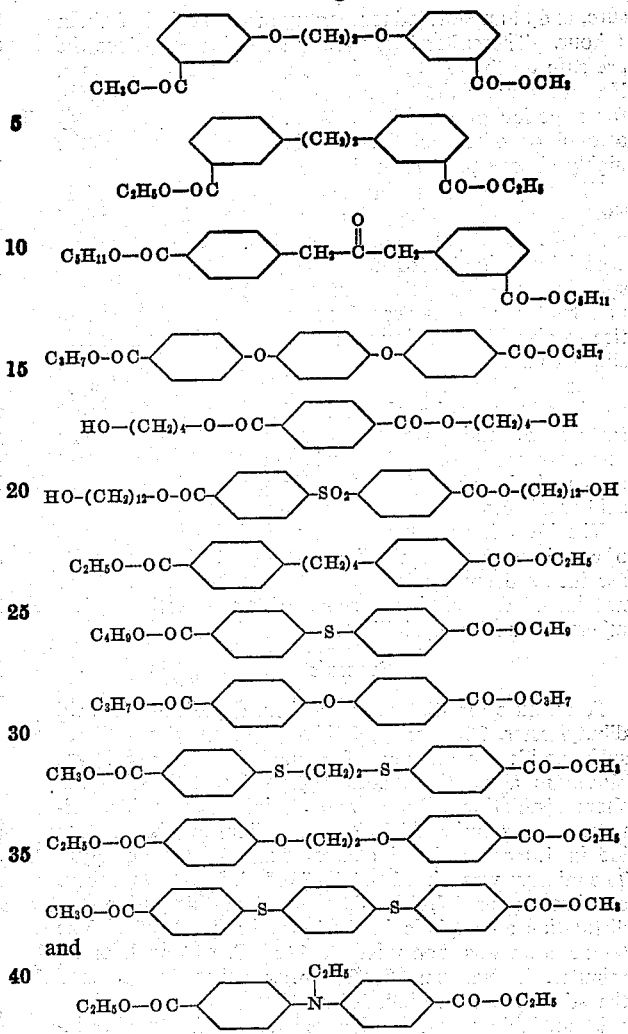

and

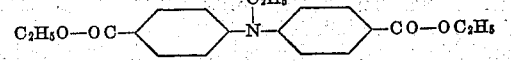

as well as the corresponding free acids.

The dihydroxy compounds which are preferably employed are the straight-chain alkane diols, i.e. the polymethylene glycols, wherein the hydroxy radicals are positioned at the two ends of the alkylene chain. As was indicated, the mono- or diesters of these glycols can also be employed, such as the acetates, propionates, and butyrates of these and similar glycols. Suitable ether glycols which can be employed instead of the polymethylene glycols or in conjunction therewith include diethylene glycol, triethylene glycol, tetraethylene glycol, bis(4-hydroxybutyl) ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when highly polymeric linear polyesters are desired.

The N,N-di(β-hydroxyethyl) benzenesulfonamide is readily prepared by reacting benzenesulfonyl chloride and diethanol amine in the presence of excess amine or an alkali such as sodium hydroxide. Alternatively, the sulfonamide can be made by treating benzenesulfonamide with ethylene oxide or ethylene chlorohydrin. The nuclearly substituted sulfonamide derivatives of this invention can be prepared in similar fashion by treating a suitable substituted benzenesulfonamide with ethylene oxide or ethylene chlorohydrin.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also show some affinity for certain classes of acid wool, direct cotton and vat dyes.

The invention is illustrated by the following examples of certain preferred embodiments thereof. The examples are included merely for purposes of illustration and are not intended to limit the scope of the invention unless otherwise specifically indicated.

Example 1

A mixture of 420 g. of p,p'-sulfonyldibenzoic acid dibutyl ester, 36 g. of N,N-di($\beta$-hydroxyethyl)-p-toluene sulfonamide, and 200 g. of pentamethylene glycol was placed in a reaction vessel equipped with a stirrer, a short distillation column, and an inlet for purified nitrogen. A solution of 0.02 g. of sodium titanium butoxide in 1.0 cc. of butyl alcohol was added as catalyst. The mixture was stirred at 200–210° C. in an atmosphere of nitrogen for 1 hour. At the end of this period, the distillation of butyl alcohol had practically stopped. The temperature was then raised to 265° C. and held for 30 minutes. A vacuum of 0.2 mm. was then applied, and the stirring was continued for 1 hour, whereby a light-colored, high viscosity polyester was obtained. The inherent viscosity of the polymer as measured in 60 phenol–40 tetrachlorethane was 0.75. This polymer was extruded into fibers by the melt-spinning process. After drawing and heating-setting, the fibers had a tensile strength of 2.8 g. per denier, and an elongation of 22%. The fibers stuck on the hot bar at 210–215° C. They could be dyed to dark shades with acetate dyes at the boil.

Example 2

A mixture of 1 mole of p,p'-sulfonyldibenzoic acid dibutyl ester, 0.15 mole of N,N-di(hydroxyethyl)-p-toluene sulfonamide, and 1.9 moles of hexamethylene glycol was reacted for 1 hour at 200–210° C. in an atmosphere of nitrogen, and in the presence of a catalytic amount of sodium titanium butoxide. Thereafter the temperature was raised to 265° C. and held for 30 minutes. The resulting polymer was freed of volatile materials under a vacuum of 0.2 mm., during which time the stirring was continued for 1 hour. Fibers prepared from the resulting modified polymers stuck to the hot bar at 215–220° C., and could be dyed with cellulose acetate dyes. When particularly heavy or dark shades are desired, a dyeing assistant can be used.

Example 3

A mixture of 420 g. of p,p'-sulfonyldibenzoic acid dibutyl ester, 57.6 g. of N,N-di($\beta$-hydroxyethyl)-p-dimethylaminobenzenesulfonamide and 200 g. of pentamethylene glycol was reacted as described in Example 1. Fibers were prepared from the resulting polyesters, and after drawing and heat-setting, the fibers had a sticking temperature of 200–210° C. These fibers can be dyed to dark shades with cellulose acetate dyes, and they can also be dyed with some acid wool dyes.

Example 4

A similar process was employed for forming a terpolymer of 0.18 mole of N,N-di($\beta$-hydroxyethyl)-m-dimethyl carboxamido benzenesulfonamide, 1.0 moles of p,p'-sulfonyldibenzoic acid dibutyl ester, and 1.9 moles of hexamethylene glycol. Fibers prepared from the resulting polymer stick at 210–215° C. and can be dyed readily with cellulose acetate dyes.

Example 5

A mixture of 1 mole of the ethyl ester of 1,2-di(p-carboxyphenyl) ethane, 0.25 mole of N,N-di($\beta$-hydroxyethyl) benzenesulfonamide and 1.8 moles of ethylene glycol was placed in a reaction vessel as described in Example 1. A solution of lithium aluminum ethylate in ethyl alcohol was added so that the reaction mixture contained 0.01% by weight of catalyst based on the weight of the reaction mixture. The mixture was stirred at 190° C. until the evolution of ethyl alcohol had practically ceased. The temperature was then raised to 260° C. and maintained for 1 hour. A vacuum of 0.1 mm. was applied, and the melt was stirred for 3 hours. A viscous polymer was obtained which was used to prepare fibers which stuck on the hot bar at 180–190° C. These fibers dyed readily with cellulose acetate dyes.

Example 6

A modified polyester was prepared from 1.0 mole of p,p'-diphenic acid, 0.25 mole of N,N-di($\beta$-hydroxyethyl) benzenesulfonamide and 0.75 mole of tetramethylene glycol. Fibers prepared from the resulting polymer stuck to the hot bar at 220–225° C. and could be dyed with cellulose acetate dyes.

Example 7

A modified polyester was prepared in similar fashion from 1.0 mole of 1,2-di(p-carboxyphenoxy) ethane, 0.10 mole of N,N-di($\beta$-hydroxyethyl)-p-hydroxy-benzenesulfonamide, and 0.90 mole of ethylene glycol. Fibers prepared from the polymer thus obtained dyed well with cellulose acetate dyes.

Example 8

A polymer was made having the composition 1.0 mole terephthalic acid, 0.15 mole N,N-di(hydroxyethyl)-p-toluenesulfonamide, and 0.85 mole ethylene glycol. It gave fibers that stuck to the hot bar at 200–210° C. They dyed well with cellulose acetate dyes.

Example 9

A polymer was made having the composition 1.0 mole terephthalic acid, 0.10 mole N,N-di($\beta$-hydroxyethyl)-p-diethylaminobenzenesulfonamide, and 0.90 mole ethylene glycol. It stuck to the hot bar at 210–215° C. and dyed readily with cellulose acetate dyes. It also could be dyed with some acid wool dyes.

Example 10

A polymer was made having the composition 1.0 mole p,p'-sulfonyldibenzoic acid, 0.10 mole N,N-di($\beta$-hydroxyethyl)-p-diethylamino-benzenesulfonamide, and 0.90 mole octamethylene glycol. The fiber can be dyed with cellulose acetate dyes and some wool dyes.

Example 11

A polymer is made having the composition 1.0 mole p,p'-sulfonyldibenzoic acid, 0.20 mole N,N-di($\beta$-hydroxyethyl)-m-dimethylsulfamido-benzenesulfonamide, and 0.80 mole hexamethylene glycol. The fibers dye well with cellulose acetate dyes.

Similar results are obtained using other combinations of a polybasic organic acid, a polyhydric alcohol, and a benzenesulfonamide derivative as defined herein. As can be seen from the examples, either or both of the dibasic acid and the poly hydric alcohol can be esterified in practicing this invention, or both can be in the unesterified form. Mixtures of any of these or similar reactants can be employed in practicing the invention to give polymers having desired properties.

The polymers embodying the invention can be prepared in accordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding ingredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such as dimethylformamide or dimethylacetamide if desired, in accordance with processes well known to the art.

Although the invention has been described in considerable detail with particular reference to certain preferred embodiments thereof, variations and modifications can be effected within the spirit and scope of the invention as described hereinabove, and as defined in the appended claims.

We claim:

1. The method which comprises coreacting at 150–300° C. to an inherent viscosity of at least 0.4, a mixture of a compound selected from the group consisting of glycols of 2–12 carbon atoms and organic acyl esters thereof wherein the acyl group contains 2–4 carbon atoms, a second compound selected from the group consisting of dicarboxylic organic acids and alkyl esters thereof wherein each alkyl group contains 1–10 carbon atoms, and a third compound consisting of a sulfonamide of the formula

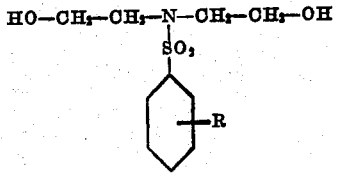

wherein R is selected from the group consisting of hydrogen and —N(CH$_3$)$_2$, —N(C$_2$H$_5$)$_2$, —SO$_2$N(CH$_3$)$_2$, —SO$_2$N(C$_2$H$_5$)$_2$, —CON(CH$_3$)$_2$, —CON(C$_2$H$_5$)$_2$, —OH, —Cl, —CH$_3$ and C$_2$H$_5$ radicals, said sulfonamide amounting to 5–25 mole percent of said mixture and the combined amount of said sulfonamide and said first-named compound amounting to at least 1.3 times the molar amount of said second compound.

2. The method according to claim 1 wherein the first compound is a polymethylene glycol containing 2–8 carbon atoms.

3. The method according to claim 1 wherein the second compound is an aromatic dicarboxylic acid.

4. A linear condensation polymer of a first compound selected from the group consisting of glycols of 2–12 carbon atoms and organic acyl esters thereof wherein each acyl group contains 2–4 carbon atoms, a second compound selected from the group consisting of dicarboxylic organic acids and alkyl esters thereof wherein each alkyl group contains 1–10 carbon atoms, and a third compound consisting of a sulfonamide of the formula

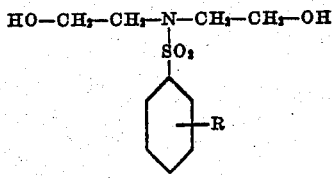

wherein R is selected from the group consisting of hydrogen and —N(CH$_3$)$_2$, —N(C$_2$H$_5$)$_2$, —SO$_2$N(CH$_3$)$_2$, —SO$_2$N(C$_2$H$_5$)$_2$, —CON(CH$_3$)$_2$, —CON(C$_2$H$_5$)$_2$, —OH, —Cl, —CH$_3$ and C$_2$H$_5$ radicals, said polymer having an inherent viscosity of at least 0.4 and containing 5–25 mole percent of said sulfonamide and a combined amount of said sulfonamide and said first compound of at least 1.3 times the amount of said second compound.

5 A synthetic fiber of a linear condensation polymer as defined in claim 4.

References Cited in the file of this patent
UNITED STATES PATENTS

| | | |
|---|---|---|
| 2,138,934 | Moss | Dec. 6, 1938 |
| 2,739,958 | Lincoln et al | Mar. 27, 1956 |
| 2,744,086 | Mowry et al | May 1, 1956 |